United States Patent [19]

Eberle

[11] 4,062,241
[45] Dec. 13, 1977

[54] APPARATUS FOR INDICATING THE CHARACTERISTIC DATA OF A CENTRIFUGE

[76] Inventor: Gunter Eberle, Gartenstrasse 100, 7200 Tuttlingen, Germany

[21] Appl. No.: 647,340

[22] Filed: Jan. 7, 1976

[30] Foreign Application Priority Data

Jan. 7, 1975 Germany .............................. 2500394

[51] Int. Cl.$^2$ .............................................. B04B 13/00
[52] U.S. Cl. .................................. 73/432 R; 73/1 DC
[58] Field of Search .................... 73/1 DC, 432 R, 509

[56] References Cited

U.S. PATENT DOCUMENTS

| 2,465,437 | 3/1949 | Engelhardt | 73/432 R X |
| 2,924,092 | 2/1960 | Bourns et al. | 73/1 DC |

Primary Examiner—James J. Gill
Attorney, Agent, or Firm—Kevin B. Clarke

[57] ABSTRACT

An apparatus is disclosed for providing a digital indication of characteristic data measurements of a centrifuge centrifugal head for examining the contents of test vessels, characterized by an indicator capable of showing directly, according to the adjustment of a selector switch, the acceleration, number of revolutions per unit of time and rotor characteristic data.

1 Claim, 2 Drawing Figures

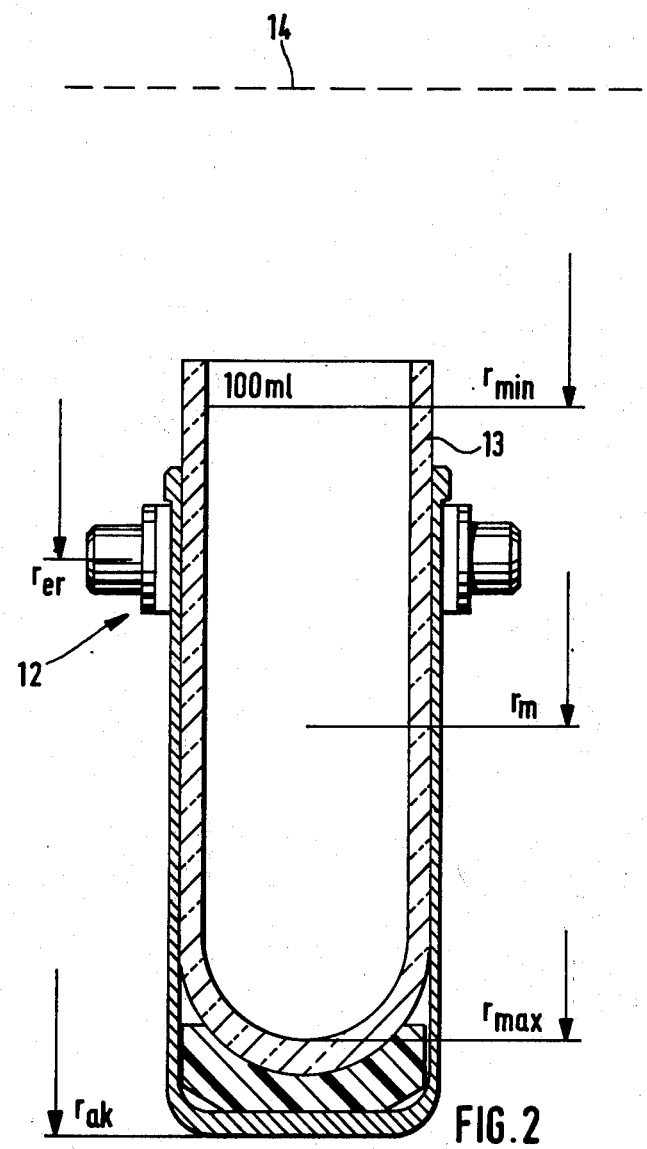

APPARATUS FOR INDICATING THE CHARACTERISTIC DATA OF A CENTRIFUGE

This invention relates to improvements in apparatus for indicating the characteristic data of a centrifuge.

The invention relates to an apparatus for the digital indication of characteristic data of a centrifuge centrifugal head for examining the contents of test vessels, namely the number of revolutions per unit of time of the centrifugal head and the acceleration of the rotor characteristic datum acting on the centrifuged material.

A laboratory centrifuge is already known having a device with which the number of revolutions as well as the different accelerations can be measured. How this device operates is not known.

The invention is based on the use of an apparatus with which, in a simple manner and for laboratory examinations, a sufficiently accurate as well as relatively rapid an indication of the characteristic data of interest of a centrifuge when centrifuging is obtained.

According to the invention an input for the maximum radius of centrifuging and an input for the minimum radius of centrifuging of the centrifuge head arrangement are provided, both inputs being connected to an electronic constructional element having an output for the numbers of rotations, the acceleration and the rotor characteristic data, and connected via a selector switch to an indicator.

According to the adjustment of the selector switch the indicator shows directly one of the three given characteristic data and is of interest in the centrifuging procedure. Hitherto only the two inputs which will be explained more precisely hereinafter had to be adjusted and in fact independently of the respective characteristic data to be read and the selector switch must be adjusted to one of the three outputs. The electronic unit translates the values given to it automatically into values which deliver via the respective connected output the respective results.

The invention is explained in more detail with reference to one embodiment from which further important features follow:

FIG. 2 shows a section through a centrifugal head with an inserted test vessel.

Figure 1:
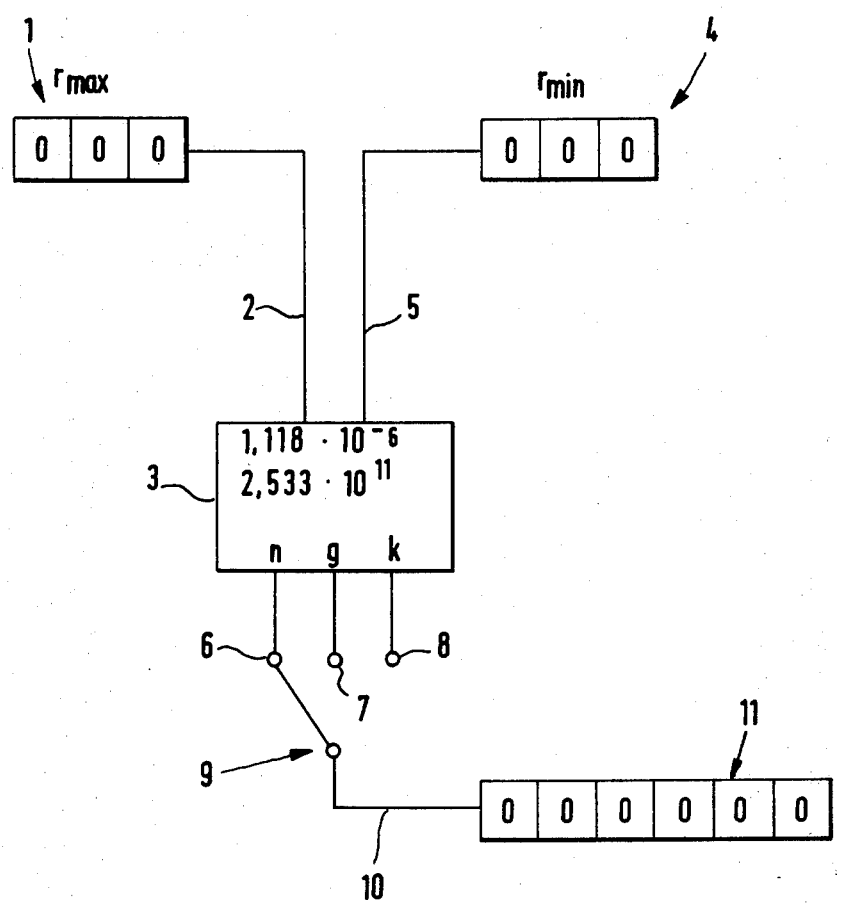
FIG. 1 shows diagrammatically a circuit diagram of an apparatus according to the invention.

An input 1 for the maximum radius of centrifuging is connected via a lead 2 to an electronic constructional element 3. A further input 4 for the minimum radius of centrifuging is connected via a further lead 5 to an input of the constructional element 3.

The constructional element has three outputs 6, 7, and 8. A selector switch 9 connects a lead 10 selectively to one of the outputs 6, 7, or 8. The lead 10 is connected to a digital indicator 11.

The input 1 and the input 4 may be manually adjusted by means of three digit counters for the adjustment of the maximum radius of centrifuging and of the minimum radius of centrifuging. Both magnitudes can be seen from the attached FIG. 2 which shows a section through a centrifuge head with a test vessel 13 mounted in a suspension 12. The axis of rotation of the centrifuge head is indicated by reference 14. Thus the maximum radius of centrifuging is equal to the distance of the axis of rotation from the bottom of the test vessel 13. The minimum radius of centrifuging depends on the actual quantity in the vessel.

In FIG. 2 the middle centrifugal radius $r_m$ and the suspension radius $r_e$, as well as the radius of the working head $r_{ak}$ are indicated. With the exception of the middle centrifugal radius and the minimum centrifugal radius, the other radii of FIG. 2 are supplied to the customer by means of data sheets in dependence on different magnitudes of the measurement for suspension and test vessels.

The number of revolutions $n$ per minute is measured directly via a speed generator, (not shown), which is fixed on the motor of the centrifuge. For indicating the number of revolutions the key "number of revolutions" (not shown) is pressed so that the selector switch 9 is set on the output 6. The notification of the actual numbers of revolutions is then shown on the indicator 11 directly numerically by the six digit figures.

As regards the acceleration, the maximum acceleration and the minimum acceleration are measured. For measuring the maximum acceleration the maximum centrifugal radius $r_{max}$ is adjusted by the respective table and in fact on the input 1.

Furthermore the minimum centrifugal radius $r_{min}$ is set at zero. The key "Acceleration" is then pressed and the indication is effected immediately.

For indication of the minimum acceleration $r_{min}$ is set on the input 4 and in fact independently of the actual or otherwise known filling quantity to be measured or $r_{min}$ must be measured as a defined distance in FIG. 2.

Furthermore $r_{max}$ is set to zero. The key "Acceleration" is then pressed whereby again the selector switch 9 is connected to the output 7 and the indication is shown directly on the indicator 11.

Finally the $k$ value can be selectively measured which is a measurement for the separation action of a laboratory centrifuge. A rotor is all the more effective the smaller the $k$ value. Furthermore with knowledge of the $k$ value and material related sedimentation constant 2 the precipitation time of the centrifugal material can be calculated in a simple manner. For measuring the $k$ value $r_{max}$ is adjusted and $r_{min}$ is adjusted. Finally the key, "$k$ value" (not shown) is pressed to connect the selector switch 9 to the output 8 and the indication is shown at the indicator 11.

The apparatus shown may, of course, also be varied so that further characteristic data of interest can be obtained and indicated from the described measurements measured or only one or two of the three measurements shown are measured and indicated.

For explaining the manner of operation of the constructional element 3 the following consideration is set forth.

With the aid of the formula $$RZB = \frac{r \cdot W^2}{g} \quad (1)$$

the multiples of the normal acceleration achievable with a centrifuge can be calculated. RZB is thus the relative centrifugal acceleration. The equation $RZB = ZB/g_n$ gives, as $ZB = r \cdot W^2$ ($W$ = angular speed in 1/S) ans $W = 2 \cdot \pi \cdot n$ and $n$ is given in revolutions per min (1 min = 60$^s$) $s$ = seconds $$RZB = \frac{r \cdot cm \cdot (2 \cdot \pi)^2 \cdot n^2 \cdot s^{-2}}{981 \cdot cm \cdot s^{-2} \cdot 60^2}$$

By shortening of the units and distribution of constants and variables one then arrives at $$RZB = \frac{(2 \cdot \pi)^2}{981 \cdot 60^2} \cdot r \cdot n^2$$

which gives $$RZB = \frac{(2 \cdot \pi)^2}{981 \cdot 60^2} \cdot r \cdot n^2 \qquad (2)$$

whereby according to definition $r$ is inserted in mm and $n$ in min$^{-1}$.

The $k$ value is derived as follows:
From the formula $$k = \frac{ln(r_{max}/r_{min})}{3600 \cdot B_s \cdot W^2} \qquad (3)$$

$$k = \frac{ln(r_{max}/r_{min}) \cdot 10^{13}}{w^2 \cdot 3600}$$

these follow:

$$k = 2{,}533 \cdot 10^{11} \frac{ln(r_{Max}/r_{Min})}{n^2} \qquad (4)$$

Radius $r_{max}$ and $r_{min}$ must be adjustable manually up to max 500 mm, $1{,}118 \cdot 10^{-6}$ and $2.533 \cdot 10^{11}$ are constant factors.

The number of revolutions appears in both equations squared.

With the $k$ value the precipitation time is calculated according to the following numerical value equation:

$t_N = k \, s$ $t_N$ = precipitation time in $h$ $k$ = rotor characteristic data measurement in $h$ $S$ = Svedberg number $S$ is also indicated as the sedimentation constant. It indicates the sedimentation properties of the particles to be centrifuged.

The constructional element 3 therefore in the manner stated effects the conversion from its inputs to the respective output.

What is claimed is:

1. An apparatus for the digital indication of data measurements of a centrifuge centrifugal head for the examination of the contents of test vessels, specifically the number of revolutions per minute of the centrifugal head, the acceleration acting on the centrifugal material and/or the rotor characteristic data comprising a measuring device to measure the speed of the centrifuge motor, an imput for the maximum centrifugal radius and an imput for the minimum centrifugal radius of the centrifugal head, said inputs being connected to an electronic constructional element containing outputs for each of the number of rotations, the acceleration and the rotor characteristics data, each output connected by means of a selector switch to an indicator.

* * * * *